United States Patent [19] | [11] 4,028,489

Berg, Jr. et al. | [45] June 7, 1977

[54] PLASTIC NAIL-ON ELECTRIC FENCE INSULATOR

[76] Inventors: Albert T. Berg, Jr.; Howard Langlie, both of Ellendale, Minn. 56026

[22] Filed: Dec. 12, 1975

[21] Appl. No.: 640,029

[52] U.S. Cl. ........................ 174/166 R; 174/158 F; 174/175; D13/17

[51] Int. Cl.$^2$ ..................... H01B 17/24; A01K 3/00

[58] Field of Search ........ 174/158 F, 161 F, 163 F, 174/164, 166 R, 168, 174, 175, 211, 212; D26/10; 248/217, 497; 256/10

[56] References Cited

UNITED STATES PATENTS

| | | | |
|---|---|---|---|
| 753,399 | 3/1904 | Hunt | 174/166 R X |
| 758,175 | 4/1904 | Cutter | 174/175 X |
| 3,300,173 | 1/1967 | Kennedy, Jr. | 248/217 X |
| 3,572,639 | 3/1971 | Shettel | 174/158 F UX |
| 3,749,820 | 7/1973 | Langlie et al. | 174/163 F |
| D233,732 | 11/1974 | Langlie et al. | D26/10 |

FOREIGN PATENTS OR APPLICATIONS

| | | | |
|---|---|---|---|
| 142,859 | 9/1935 | Austria | 248/217 |
| 962,302 | 12/1949 | France | 174/168 |
| 1,191,747 | 5/1970 | United Kingdom | 174/166 R |

*Primary Examiner*—Laramie E. Askin
*Attorney, Agent, or Firm*—Stuart R. Peterson

[57] ABSTRACT

A shell-like all plastic insulator has an angled surface formed with a flat boss having a nail hole extending therethrough so that a nail can be driven into a wooden post in order to securely attach the insulator thereto, the boss having a width such that the nail can later be pulled out with a claw hammer and the insulator reused. Rearwardly spaced ribs act as cleats against the post to prevent the insulator from rotating about the nail. Jaws or hooks for holding the electric fence wire project forwardly and are at a location such that the weight of the wire does not tend to pull out the nail.

3 Claims, 6 Drawing Figures

*Fig 1*
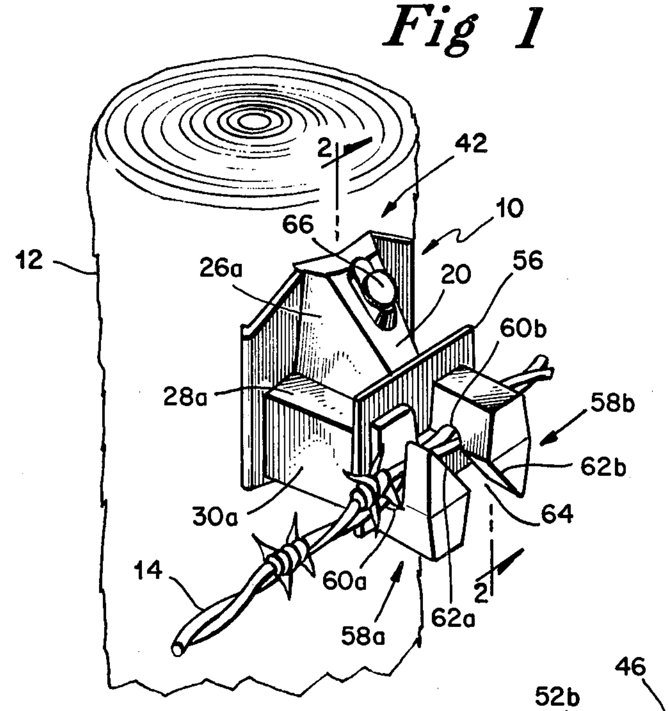
*Fig 4*
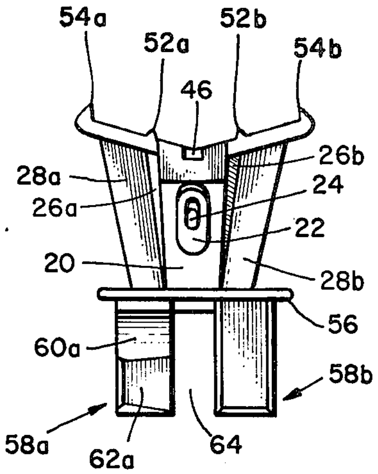
*Fig 6*
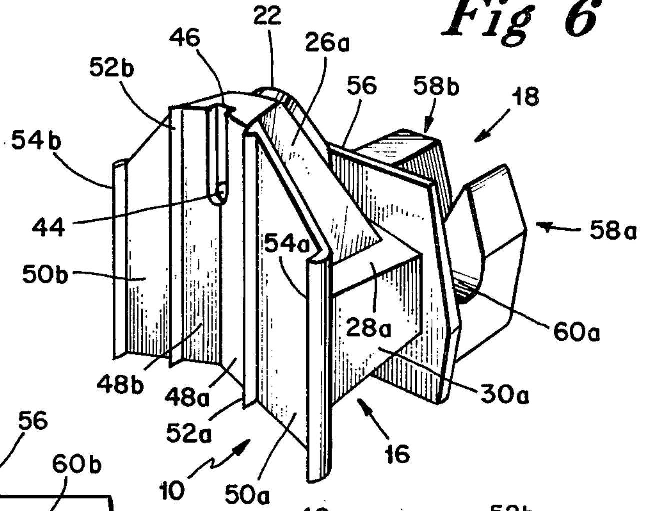
*Fig 2*
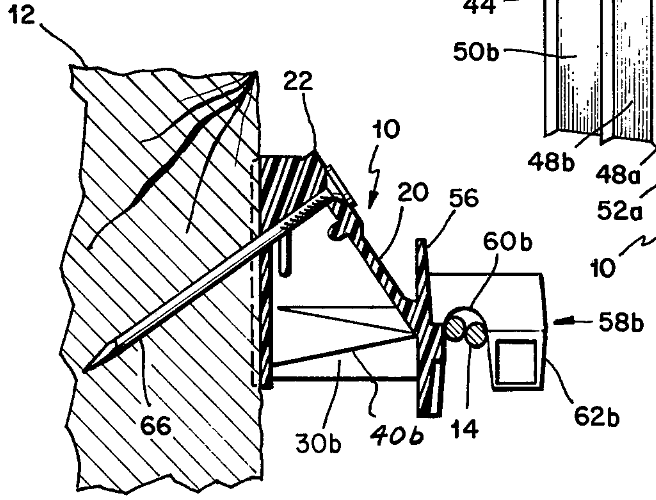
*Fig 3*
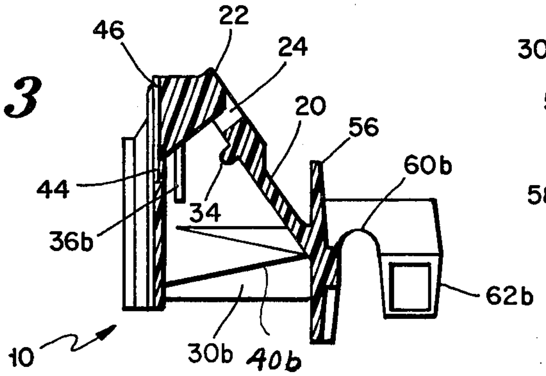
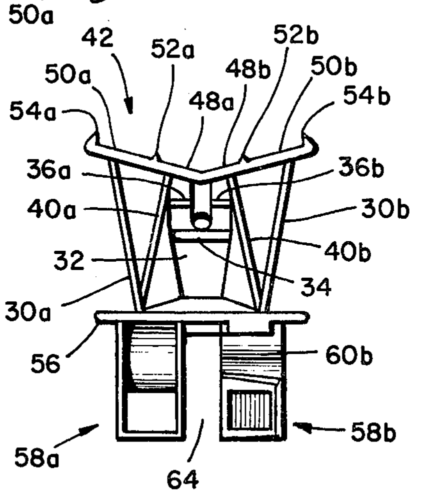
*Fig 5*

PLASTIC NAIL-ON ELECTRIC FENCE INSULATOR

BACKGROUND OF THE INVENTION

1. Field of the Invention

This invention relates generally to electric fence insulators, and pertains more particularly to an insulator that is nailed to a wooden post.

2. Description of the Prior Art

Various electric fence insulators have been devised for wooden posts. Some require more than one nail in order to assure that the insulator will not turn upside down. Others become inadvertently detached from the post. Some are quite costly, requiring a considerable amount of material. Still others do not adequately possess the proper dielectric properties, particularly when subjected to moisture and even more critically when the post itself becomes "water logged". Furthermore, in some cases, if care is not exercised during the hammering of the nail into the post, the insulator will break due to the impact forces to which it is subjected. Some are designed so that it is difficult, or even impossible, to reuse the insulator in that the nail or nails cannot be readily retracted. In the past, some of the foregoing shortcomings having been overcome but only at an increased manufacturing cost.

SUMMARY OF THE INVENTION

Accordingly, a general object of the present invention is to minimize the difficulties that have persisted through the years with respect to insulators of the nail-on type.

One important object of the invention is to provide a fence insulator that can be molded of plastic and yet which will withstand the impact forces that are apt to be developed when driving the nail into the wooden post.

Another object is to minimize the likelihood of the insulator becoming inadvertently detached from the post, such as by the weight of the wire being held or by any force applied to the wire during periods when the electric fence may not be energized. On the other hand, an aim of the invention is to facilitate the intentional removal of the insulator when its detachment and possible re-use is desired.

Also, the invention has for an object the prevention of the insulator from rotating or turning upside down, even though a single nail is employed.

Yet another object is to provide an electric fence insulator that can be hooked to the electric fence wire prior to nailing the insulator to the wooden post, the nailing operation then being performed without difficulty. In this regard, an aim of the invention is to permit the electric fence wire to be pulled extremely taut so that it need not be deflected from its straight line condition in the mounting of the insulator, which must be done if the insulator is first nailed to the post and the wire then attached thereto.

Still another object of the invention is to provide an insulator that can be fabricated at a relatively low cost, thereby encouraging its widespread use by ranchers and farmers.

A further object is to provide an electric insulator that will have exceptionally good dielectric properties under all weather conditions. More specifically, it is planned that the insulator not provide a low resistance path to whatever post it is attached, even when wet. It is within the purview of the invention to provide surfaces that readily shed whatever moisture that would otherwise be collected on the insulator, thereby further assuring that there will not be a low resistance path from the fence wire to ground.

BRIEF DESCRIPTION OF THE DRAWING

FIG. 1 is a perspective view of our insulator after it has been nailed to the upper portion of a wooden fence post;

FIG. 2 is a sectional view taken in the direction of line 2—2 of FIG. 1;

FIG. 3 is a sectional view corresponding to FIG. 2 but only of the electric fence insulator without the post, nail and electric fence being depicted;

FIG. 4. is a top plan view of FIG. 3;

FIG. 5 is a bottom plan view of FIG. 3, and

FIG. 6 is a rear perspective view of the insulator for the purpose of illustrating the back side thereof.

DESCRIPTION OF THE PREFERRED EMBODIMENT

It will be discerned from FIG. 1 that the electric fence insulator exemplifying our invention has been indicated generally by the reference numeral 10. Further, it is shown as being attached to a wooden post 12, only the upper end of the post being illustrated. Still further, barbed wire 14 is fragmentarily depicted; of course, the wire can constitute a single unbarbed strand, as is frequently employed for electric fencing.

Our insulator 10 can be described as constituting two distinct portions, although it will be recognized at the outset that the portions are integral with each other, it being contemplated that the insulator 10 be fabricated from plastic, preferably linear polyethylene. As the description progresses, it will become obvious that the insulator, even though rather complex, lends itself readily to being molded in one piece. At any rate, the body of the insulator has been labeled 16 and the means for holding the wire 14 has been assigned the reference numeral 18.

Referring now in detail to the body 16, it is to be noted that the body includes a centrally disposed sloping panel 20, the panel 20 actually angling or inclining upwardly from a portion of the wire holding means 18. It will also be observed that the sloping panel 20 is formed with an elongated raised platform or flat boss 22 having a nail hole 24 therein. Extending downwardly from the side edges of the angled panel 20 are side panels **26*a*, 26*b*. Still further, there are flanking panels 28*a*, 28*b* at an intermediate elevation as far as the height of the insulator is concerned, these panels sloping slightly downwardly and outwardly as is believed evident from FIGS. 1 and 6 in which the panel 28*a* appears. Outer side panels 30*a*, 30*b* extend downwardly from the flanking panels 28*a*, 28*b*.**

The structural arrangement described above for the body 16 provides a space or void 32 beneath the sloping panel 20. It is within the void 32 that a transverse rib 34 (FIG. 5) is placed plus two guide ribs **36*a* and 36*b*, the guide ribs being spaced from each other a distance corresponding to the diameter of the nail hole 24. Although the nail itself has not yet been referred to, it can be explained that the ribs 36*a*, 36*b*, as their name implies, guide the nail as it is being pounded or hammered into the post 12. The space or void 32 extends downwardly beneath the flanking panels 28*a*, 28*b* and also extends between the outer side panels 30*a*, 30*b*,** there being rearwardly converging reinforcing walls 40a, 40b within the lower portion of the void 32.

At this time, attention is directed to a rear wall 42 having a nail hole 44 (see FIGS. 3 and 6) disposed therein. The nail hole 44 is at a lower elevation than the nail hole 24, as can readily be seen from FIG. 3 (and also FIG. 2). A vertical slot 46 (best seen in FIGS. 4 and 6) extends downwardly from the top of the wall 42 to the nail hole 44, the slot 46 permitting visual inspection of the nail as it is pounded into the post 12.

Continuing with the description of the rear wall 42, it will also be noted that the wall 42 contains a pair of central panels 48a, 48b which extend at an angle somewhat less than 180° with respect to each other, and that these panels 48a, 48b are connected to outer or wing panels 50a, 50b. It is important to observe that there are rearwardly directed knife edge ribs 52a, 52b and similar ribs 54a, 54b. The ribs 52a, 52b are disposed at the juncture of the panels 48a, 48b with the panels 50a and 50b, as can be readily understood from FIG. 6.

Referring now to the wire holding means 18, it will be seen that there is a vertical panel 56. Projecting forwardly from the vertical panel 56 are hook or jaw members 58a, 58b which are spaced laterally from each other. The jaw member 58a has an upwardly facing groove 60a, whereas the jaw member 58b has a downwardly facing groove 60b. The jaw 58a is provided with a sloping surface 62a, and the jaw 58b with a sloping surface 62b. Thus, the surface 62a inclines upwardly from what could be termed as horizontal line and the surface 62b downwardly from such a line. There is a spacing denoted by the reference numeral 64 which permits the wire 14 to be flexed at an angle so as to be thrust into the holding means 18 and retained in the grooves 60a, 60b. On the other hand, the insulator 10 can be hooked to the wire 14 before it is mounted or attached to the post 12, it only being necessary to rotate the insulator through approximately 45° from a horizontal position in order to insert the wire 14 through the spacing 64.

Irrespective of whether the insulator 10 is attached to the post 12 first and then the wire 14 inserted, or attached to the wire 14 and then mounted to the post, it is planned that a conventional nail 66, such as a six or eight penny nail, be used for attaching the insulator 10 to the post 12. If the insulator 10 is to be first attached, that all that the user need do is to insert the tip or point of the nail into the upper hold 24 and then with a hammer pound the nail angularly downwardly so that it passes through the lower hole 44. The ribs 36a, 36b, owing to their lateral spacing, guide the nail in the direction of the hole 44. The slot 46 permits the nail point to be observed as it passes through the hole 44 into the post 12.

After the nail 66 has been fully pounded into the post 12, it will be appreciated that the ribs 52a, 52b, 54a, 54b, particularly because of their knife edge configuration, act as cleats to prevent any rotation of the insulator 10 about the nail 66. Consequently, only a single nail 66 securely anchors the insulator 10 to the post 12. It will be recognized, particularly from FIGS. 4 and 5, that the insulator 10 can be mounted on posts differing in diameter. Usually, all four ribs 52a, 52b, 54a, 54b will engage the post, but should the post 12 have a relatively small diameter, then the ribs 52a, 52b will engage the post; on the other hand, if the post is quite large in diameter, then the ribs 54a, 54b will engage such a post.

Irrespective of the number of ribs 52a, 52b, 54a, 54b actually contacting the post 12, it is important to appreciate that when the insulator 10 is being attached, it is subjected to rather severe impact forces. It is, of course, essential that the insulator 10 not fracture. In this regard, the flat boss 22, which surrounds the nail hole 24, initially acts to spread or disperse the pounding forces as the nail 66 is advanced. Those forces that are applied are generally in the direction of the post and it will be appreciated that the side panels 26a, 26b transmit the impact forces rearwardly to the wall 42. Any tendency for the insulator 10 to rock during the hammering operation is, of course, resisted by the rear wall 42 which confronts the post 12, especially after the knife-edge ribs 52a, 52b, 54a, 54b become embedded in the post. It is not in any sense of the word necessary that the ribs 52a, 52b, 54a, 54b become embedded; it is only necessary that they engage the post. Once in tight engagement with the post, the ribs prevent any rotation of the insulator 10 about the nail 66, it being particularly desirable to prevent the insulator 10 from rotating through 180° so that it would assume an upside down position. In attaching the insulator 10, the internal ribs 40a, 40b also assist in distributing the force to the rear wall 42. Thus, even though our insulator weighs only one-half ounce, it is extremely rugged, making it such that it can withstand very high impact forces deriving from the hammering of the nail 66.

Not only does the insulator 10 withstand severe impact forces, but once mounted, as best discerned from FIG. 2, any tendency for the wire 14 to rock the insulator 10 in a clockwise direction will be in a direction such that the nail 66 will not be pulled outwardly in the direction in which it was hammered. The rocking action, instead, will tend to have the insulator rotate or pivot about the lower edge of the rear wall 42 and this will tend to pull the head of the nail downwardly which is resisted by the nail not being able to move upwardly within the post 12.

Although most of the advantageous features of our invention have been dealt with, and certainly should be obvious from a consideration of the drawing, it should be mentioned in greater particularity that the insulator 10 can be attached to the wire 14, even though quite taut, prior to mounting it on the post 12. The particular procedure that would be adopted has not been illustrated, but it should be apparent from, say, FIG. 1 that if the nail 66 has not been pounded into the post 12 through the insulator 10 that when the insulator 10 is still free and held by the installer's hand it can be rotated so that the surfaces 62a, 62b are parallel to the wire 14 and thus the insulator 10 can be moved relative to the wire so that it passes through the spacing 64. Once the wire has been received through the spacing 64, then a rotation of the insulator so as to cause the wire to seat in the grooves 60a, 60b, which is the relationship appearing in FIG. 1, enables the farmer or rancher to then take the nail 66, insert it into the hole 24 and finally pound the nail angularly downwardly through the hole 44 while the wire 14 is held or anchored in the holding means 18 as just described. It is important to recognize that there is no portion of the insulator 10 that would interfere with the pounding operation. Once attached in this manner, then the insulator 10 is retained in its anchored position in which the rear wall 42 confronts the post 12 and will not shift or angularly rotate from that point on.

Another nicety of the invention is that the insulator 10, should circumstances so dictate, can be re-used. All that need be done is that the nail 66 be retracted or pulled from the post and then re-hammered when the insulator 10 is to be mounted on another post. Inspection of FIG. 1 will demonstrate that the head of the nail 66 overhangs the sides of the elongated boss or raised platform 22. To pull out the nail 66, the claws of a hammer (or pinch bar) straddle the boss 22 and act against the overhanging chordal segments of the nail head when the hammer (or pinch bar) is rocked to pull out the nail 66. Consequently, it is easy to re-use the insulator any number of times without any impairment of the insulator or loss of its effectiveness.

It should also be noted that the nail 66, once the insulator 10 is mounted on the post 12, is spaced an appreciable distance from the wire 14. Should the post 12 be even partially electrically conductive, such as from weather exposure and becoming "water logged", the spacing between the held wire 14 and the nail 66 makes it such that this relatively long path that must be traversed by electrical current pulses provided by the controller (not shown) will not pass from the wire 14 to the post 12 via the nail 66. Also, due to the slope imparted to the various surfaces of the panels 20, 26*a*, 26*b*, 28*a*, 28*b*, 30*a*, 30*b*, as well as the vertical panel 56, the insulator 10 continually sheds moisture. There is absolutely no place for moisture to collect and the insulator 10, owing to the shedding of water, is continually effective as an excellent electric insulator, its intended purpose.

We claim:

1. An all plastic nail-on electric fence insulator for attachment to wooden posts by means of a single nail comprising a body having a generally hollow interior, said body including a first angled panel inclining upwardly and rearwardly and second and third side panels extending downwardly and rearwardly from said first panel, means at the front of said body for holding an electric fence wire, and means at the rear of said body including a central panel extending between the rear edges of said second and third panels and wing panels extending laterally from said central panel, said rear means also including a first pair of rearwardly extending vertically disposed ribs at the junctures of said central panel with said wing panels and a second pair of rearwardly extending vertically disposed ribs at the free vertical edges of said wing panels, the angled first panel of said body having a nail hole therein so that a nail inserted into said hole can be driven into the post at an angle generally perpendicular to said angled first panel, a raised boss on said angled first panel, said nail hole extending through said boss and first panel, said central panel also having a hole therein at an elevation lower than that of the hole in said angled first panel, said body further including fourth and fifth panels extending laterally from the lower edges of said second and third panels and sixth and seventh panels extending downwardly from the outer edges of said fourth and fifth panels, said first, second, third, fourth, fifth, sixth and seventh panels, together with the back side of said front means and the central and wing panels of said rear means, forming said generally hollow interior, and reinforcing walls converging from the forward ends of said sixth and seventh panels rearwardly to said rear central panel, said reinforcing walls connecting with said central panel generally in forward alignment with said first-mentioned ribs.

2. An electric fence insulator in accordance with claim 1 including a pair of internal ribs extending inwardly from the second and third panels of said body, the inner edges of said ribs being spaced from each other to provide a guide for a nail inserted through said nail hole.

3. An electric fence insulator in accordance with claim 1 in which said central panel has a vertical slot extending downwardly from its top to the hole in said central panel to permit visual inspection of the nail as it is driven into the post.

* * * * *